United States Patent Office 2,872,327
Patented Feb. 3, 1959

2,872,327

REFRACTORY BODIES CONTAINING BORON NITRIDE AND A BORIDE, AND THE MANUFACTURE THEREOF

Kenneth M. Taylor, Lewiston, N. Y., assignor to The Carborundum Company, Niagara Falls, N. Y., a corporation of Delaware No Drawing. Application October 25, 1954
Serial No. 464,655

13 Claims. (Cl. 106—55)

This invention relates to shaped bodies or articles of manufacture consisting essentially of refractory boride and boron nitride, and to compositions and methods for making the same. This patent application is a continuation-in-part of my co-pending application Serial No. 288,554, filed May 17, 1952, now abandoned.

There is a constant search for new compositions or bodies that possess unexpected combinations of properties essential to or desirable in specific fields of use. The bodies of the present invention possess certain combinations of properties and characteristics that render them of considerable value, and they offer outstanding possibilities in a number of fields of use. It is, therefore, to be understood that the refractory boride-boron nitride bodies hereinafter more fully described are not to be considered as restricted to any particular field of use. However, their outstanding characteristics as refractory materials are particularly worthy of note and make them especially suitable for many refractory purposes. The present invention therefore will be described primarily in respect to using the herein described products for refractory purposes, although not intended to be limited thereto.

Above all a refractory body must possess refractoriness, that is, ability to stand up under exposure to high temperatures without undue chemical or physical change. Other desirable characteristics sought in a refractory body or shape include an ability to resist sudden changes in temperature without cracking or otherwise breaking down, a satisfactorily high mechanical strength at elevated temperatures as well as at room temperature, chemical inertness and resistance to various corrosive and erosive substances and conditions, a resistance to oxidation, and a density and hardness dependent upon the use to which the refractory body or shape is to be put.

In order to obtain a high degree of perfection in one or more of the above properties, it has usually been necessary to forego the benefit of maximum performance in respect to certain other desirable properties. Consequently, various refractory compositions exceptionally suited for one use frequently are entirely unsatisfactory for other purposes. There is, therefore, a continual need for refractory bodies of new composition that will meet those demands of a special nature which require novel combinations of properties not to be found in compositions already available.

It is an object of the present invention to provide bonded refractory bodies or shapes of unusual and distinctive compositions and properties.

It is another object to provide refractory bodies or shapes having a particular combination of properties heretofore unavailable in refractory compositions.

It is another object to provide novel compositions of matter consisting essentially of refractory boride material and boron nitride.

It is a further object to provide practical methods and compositions for making such articles.

The shapes or bodies of the present invention comprise boron nitride and refractory boride material. The amount of boron nitride present in the bodies may range from almost 0%, such as 1 or 2%, to almost 100% by weight of the bodies. The preferred compositions of the present invention, however, contain only up to about 50% by weight boron nitride, with the best bodies containing not over about 20% by weight boron nitride.

The bodies or articles of the present invention are made by hot-pressing the raw mixes in a graphite mold at a temperature somewhat lower than the temperature at which the particular raw mix becomes so plastic as to be extruded from the mold around the plunger. With compositions high in boride content, the maximum hot-pressing temperature is usually slightly below the melting temperature of the boride. The hot-pressing is preferably carried on at pressures of from 500 to 750 pounds per square inch or more.

The boron nitride used in carrying out the present invention may be either a high or low purity boron nitride material available on the market. For example, it may be an impure boron nitride made in accordance with the process described in my copending United States patent application Serial No. 288,553, which issued October 1, 1957, as U. S. Patent No. 2,808,314. This boron nitride material is made by nitriding a porous pelleted mixture of boric acid or boric oxide and tricalcium phosphate by heating it in ammonia gas at a temperature of around 900° C. After nitriding the resulting nitrided pellets are treated with dilute hydrochloric acid to dissolve the tricalcium phosphate and other extraneous materials. The undissolved boron nitride, after washing with water, is usually treated with hot 95% alcohol solution to further lower the content of extraneous materials. The material is then dried by allowing it to stand overnight at room temperature followed by heating for two hours at 300° F. A typical analysis of the boron nitride is as follows:

| | Percent |
|---|---|
| Boron | 41.45 |
| Nitrogen | 44.00 |
| Free boric acid (calculated as $H_3BO_3$) | .75 |
| Silica | .28 |
| Calcium | Trace |
| Phosphate ($PO_4$) | Trace |
| Material volatile at 110° C | .26 |
| Extraenous matter, estimated to be combined oxygen | 13.26 |

Although this material contains no alcohol soluble material, it is believed that it contains up to about 20% of an oxidic boron compound combined either chemically or physically so as to be insoluble in alcohol and water.

An example of a high purity boron nitride material that may be used in the process of the present invention is the material made in accordance with the process described in my United States patent application Serial No. 413,968. Boron nitride material is made in accordance with this patent application by first preparing a low purity boron nitride material, such as the boron nitride material prepared in accordance with the process of my above-mentioned patent application Serial No. 288,553, and then heating the low purity boron nitride material in an atmosphere of ammonia at a temperature ranging from about 1100 to 1500° C. A typical analysis of the resulting high-purity boron nitride material is as follows:

| | Percent |
|---|---|
| Boron | 43.3 |
| Nitrogen | 53.3 |
| Oxygen | 2.23 |
| Silica | 0.25 |
| Calcium | Nil |
| Iron and aluminum oxides | 0.16 |

I have further found that if boron nitride prepared in accordance with my patent application Serial No. 288,553, is subsequently, before use, subjected to a heating pre-treatment in which the material is heated in an inert atmosphere at a temperature in the neighborhood of 1900 to 2200° C., molded shapes containing the thus treated material are superior for certain uses.

The refractory boride material employed in the process of the present invention may be any of the well-known refractory borides, preferably being selected from the group consisting of zirconium boride, titanium boride, molybdenum boride, chromium boride, carbon boride, and mixtures thereof.

The refractory borides used in carrying out the present invention may be any high purity grade of refractory boride available on the market. However when borides other than carbon boride are used in carrying out the present invention, it is preferred to use a product made in accordance with K. C. Nicholson United States patent application Serial No. 252,190. Briefly the process for the manufacture of metal borides, such as $ZrB_2$ and $TiB_2$, in accordance with this patent application comprises reacting a mixture of metal oxide, boron carbide and carbon and/or metal to produce metal boride.

The carbon boride that I use in carrying out the invention, and which is more often referred to as boron carbide, is commercially available and methods for preparation need not be described for purposes of understanding or performing the practices of the present invention.

In order that the invention may be more clearly understood, the following examples are submitted as illustrative of compositions for and the manner of carrying out the present invention.

EXAMPLE I

Raw mixes consisting essentially of boron nitride (made as per patent application Serial No. 288,553) and finely divided zirconium boride were mixed by grinding together for 24 hours in alcohol in a ball mill lined with sintered tungsten carbide. The resulting mixtures were placed in a cylindrical graphite mold having two movable graphite plungers. The assembled mold was placed in a graphite chamber of a high frequency furnace and heated as follows: The temperature of the mold was raised to approximately 2100° C. over a period of 1½ hours and held at approximately 2100° C for 10 minutes under a minimum pressure of 500 p. s. i. The furnace was then allowed to cool to room temperature. The furnace chamber was cylindrical, 12″ long and 4″ inside diameter and was closed during the heating and cooling periods except for an opening in the top about one half inch in diameter through which temperature observations were made. Table I below presents fabricating data and physical properties of the various bodies consisting essentially of boron nitride and zirconium boride made in accordance with this example of the process of the present invention.

Table I
BODIES CONSISTING ESSENTIALLY OF BORON NITRIDE AND ZIRCONIUM BORIDE HOT-PRESSED AT 2100° C.

| Bar No. | Raw Mix Composition, Percentage by Weight | Pretreatment of BN | Molding Pressure, p. s. i. | Sand blast Penetration,[1] inches | Apparent Density, gms./cc. |
|---|---|---|---|---|---|
| 1 | 50% BN; 50% $ZrB_2$ | None | 500 | .065 | |
| 2 | 50% BN; 50% $ZrB_2$ | Prefired in $N_2$ at 2,150°–2,200° C. | 500 | .200 | |
| 3 | 20% BN; 80% $ZrB_2$ | Prefired in $N_2$ at 2,150°–2,200° C. | 500 | .004 | 4.21 |
| 4 | 15% BN; 85% $ZrB_2$ | Prefired in $N_2$ at 1,900° C. | 2,000 | | 4.39 |

[1] Standard penetration on plate glass when subjected to the same penetration test is .010″

EXAMPLE II

Boron nitride-refractory boride bodies using other metal borides were made in accordance with the procedures set forth in Example I, except that the boron nitride was prepared as per patent application Serial No. 413,968 and certain of the bodies were hot-pressed at temperatures lower than the temperature employed in Example I. Table II below presents fabricating data and physical properties of the various bodies consisting essentially of boron nitride and refractory boride.

Table II
BODIES CONSISTING ESSENTIALLY OF BORON NITRIDE AND METAL BORIDE

| Bar No. | Raw Mix composition, Percentage by Weight | Pretreatment of BN | Molding Temp., ° C. | Molding Pressure, p. s. i. | Sandblast Penetration [1] inches | Apparent Density, gms./cc. |
|---|---|---|---|---|---|---|
| 5 | 20% BN; 80% $ZrB_2$ | Prefired in $N_2$ at 1,900° C. | 2,000 | 2,000 | | 3.49 |
| 6 | 15% BN; 85% $Mo_2B$ | Prefired in $N_2$ at 1,900° C. | 1,600 | 2,000 | .006 | 5.75 |
| 7 | 15% BN; 85% $Cr_2B$ | Prefired in $N_2$ at 1,900° C. | 1,600 | 2,000 | .009 | 4.15 |
| 8 | 80% BN; 20% $TiB_2$ | None | 1,800 | 2,000 | .008 | 2.24 |

[1] Standard penetration on plate glass when subjected to the same penetration test is .010″.

EXAMPLE III

Twenty parts by weight of boron nitride and eighty parts by weight of carbon boride were thoroughly dry mixed. The boron nitride was previously prefired in ammonia gas at 1400° C. for eight hours. The carbon boride, otherwise known as boron carbide, was 180 mesh and finer material obtained from The Norton Company, Worcester, Massachusetts. Nine grams of the resulting mixture were placed in a cylindrical graphite mold having an inside diameter of approximately ½″ and having two movable graphite plungers. The assembled mold was placed in a cylindrical graphite chamber 4″ inside diameter and 12″ length in a high frequency furnace having means for applying pressure to the plungers of the mold. The chamber of the furnace was closed except for an opening in the top about ½″ in diameter through which temperature observations were made. The temperature of the furnace was raised to 2100° C. over a period of about 1½ hours and maintained at approximately that temperature for amout 10 minutes, and then allowed to cool to room temperature. A pressure of 750 pounds per square inch was maintained on the plungers of the mold during the heating and cooling periods.

The resulting hot pressed piece was dense, strong and hard, the apparent density being 2.25 gms./cc. The sandblast penetration was .003" as compared to the penetration on plate glass by the same test of .010".

The resulting shape further showed a relatively satisfactory resistance to oxidation, the article undergoing a weight loss of only 1.8% after heating in air for 24 hours at 1000° C.

Table III presents fabricating data and properties of hot pressed bodies of boron nitride and carbon boride. Table III below and other experience also show the greater hardness of bodies composed of boron nitride and carbon boride when the percentage of boron nitride is lowered from 50% to around 20% by weight of the body. The boron nitride was prefired at 1400° C. prior to incorporation in the mixtures from which the bodies were made.

*Table III*

BODIES CONSISTING ESSENTIALLY OF BORON NITRIDE AND CARBON BORIDE

| Example No. | Raw Mix Composition Percentage by Weight | | Pretreatment of Boron Nitride | Sandblast Penetration,[1] inches | Apparent Density, g./cc. | Compressive Strength in p. s. i. |
|---|---|---|---|---|---|---|
| | Boron Nitride | Carbon Boride | | | | |
| 1 | 50 | 50 | None | .088 | | |
| 2 | 50 | 50 | None | .068 | | |
| 3 | 20 | 80 | (2) | .003 | 2.25 | 22,000 |

[1] Standard penetration on plate glass when subjected to the same penetration test is .010 of an inch.
[2] Prefired in ammonia 8 hours at 1,400° C.

While I have described in the above examples the making of various molded bodies in which the body is molded and fired to the exact shape and form in which it is intended for use, the present invention is not intended to be so restricted. Another way of making and using nitride-boride bodies of the present invention is to mold the raw batch of material into briquettes or other shapes or otherwise compress a mass of the material having a composition in the desired proportions, after which the resulting briquettes or compressed bodies are hot pressed in a manner already described. After removal from the furnace, they are crushed to granular form of the desired grit size. The resulting granular material can then be used in loose granular form as a high temperature refractory material or as a layer of high temperature insulation material, as, for example, insulation or protection around jet engines and rocket combustion chambers, or as a layer of insulation around industrial furnace chambers. It may also be used as a loose filtering media or as a catalyst or catalyst carrier material. The granular material can also be bonded by means of sintered metals, vitreous or ceramic bonds or other bonding material to form articles suitable for many of the industrial uses set forth elsewhere herein.

It is to be understood that the products of the present invention in its various modifications are not limited to any specific field or fields of use such as might be defined by the specific examples previously set forth. The products can be made in any desired shape as well as provided in granular or aggregate form. They are, therefore, not only suited for many of the uses for which industrial refractories are required, including bracks, blocks, setter tile, muffles, kiln furniture, and special shapes for application in and around furnaces and other high temperature equipment, but they are also well suited for many specialty high temperature applications, such as jet engine combustion chambers, lining for exhaust nozzles, rocket combustion chambers and exhaust nozzles, turbine blades, stator blades, lens fusion blocks, and the like. They are also suitable for the fabrication of laboratory ware, including combustion boats, crucibles, burner holders, and other shapes. The bodies of the present invention, particularly when modified by the use of pore formers in the raw batch from which the bodies are made, are also highly useful as diffusion and filtering media, such as diffusion tubes and plates, filtering tubes, plates and shapes, or as catalysts or catalyst carriers and supports. Materials and articles of the present invention can also be used for making abrasive articles such as grinding wheels, sharpening stones, razor hones, and other grinding and polishing shapes and materials. The present bodies offer possible applications in the electrical and radio industry including supports in electric light bulbs, radio tubes, X-ray tubes and radar equipment, resistors and grid leaks.

Having described the present invention it is desired to claim:

1. As a new article of manufacture, a body consisting essentially of boron nitride and boride selected from the group consisting of zirconium boride, titanium boride, molybdenum boride, chromium boride, carbon boride, and mixtures thereof, the boride amounting to 20% to 99% by weight of the body.

2. As a new article of manufacture, a body consisting essentially of boron nitride and boride selected from the group consisting of zirconium boride, titanium boride, molybdenum boride, chromium boride, carbon boride and mixtures thereof, boron nitride amounting to 1% to 80% by weight of the body.

3. As a new article of manufacture, a body consisting essentially of boron nitride and boride selected from the group consisting of zirconium boride, titanium boride, molybdenum boride, chromium boride, carbon boride and mixtures thereof, said boride amounting to 50% to 99% by weight of the body.

4. A refractory article consisting essentially of zirconium boride and boron nitride, boron nitride being present in said article from 1% to 50% by weight.

5. A refractory article consisting essentially of titanium boride and boron nitride, boron nitride being present in said article from 1% to 50% by weight.

6. A refractory article consisting essentially of molybdenum boride and boron nitride, boron nitride being present in said article from 1% to 50% by weight.

7. A refractory article consisting essentially of chromium boride and boron nitride, boron nitride being present in said article from 1% to 50% by weight.

8. A refractory article consisting essentially of carbon boride and boron nitride, boron nitride being present in said article from 1% to 50% by weight.

9. A method of making bonded shapes which comprises selecting a mixture consisting essentially of boron nitride and boride selected from the group consisting of zirconium boride, titanium boride, molybdenum boride, chromium boride, carbon boride and mixtures thereof, the boride amounting to 20% to 99% by weight of the mixture, placing the mixture in a mold and hot pressing said mixture at a minimum pressure of 500# per sq. in.

10. A method of making bonded shapes which comprises selecting a mixture consisting essentially of boron nitride and boride selected from the group consisting of zirconium boride, titanium boride, molybdenum boride, chromium boride, carbon boride and mixtures thereof, said mixture containing 1% to 50% by weight boron nitride, placing the mixture in a mold and hot pressing said mixture at a minimum pressure of 500# per sq. in.

11. A method of making bonded shapes consisting essentially of boron nitride and a refractory boride selected from the group consisting of zirconium boride, titanium boride, molybdenum boride, chromium boride, carbon boride and mixtures thereof, which comprises selecting a mixture of boron nitride and boride, said mixture containing 1% to 50% by weight boron nitride, placing the mixture in a mold and hot pressing said mixture at a minimum temperature of around 1600° C. and a minimum pressure of 500# per sq. in.

12. A raw batch for the manufacture of refractory bodies consisting essentially of boron nitride and a boride selected from the group consisting of zirconium boride, titanium boride, molybdenum boride, chromium boride, carbon boride and mixtures thereof the boride amounting to 20% to 99% by weight of the mixture.

13. A raw batch for the manufacture of refractory bodies consisting essentially of boron nitride and a boride selected from the group consisting of zirconium boride, titanium boride, molybdenum boride, chromium boride, carbon boride and mixtures thereof, said boron nitride amounting to 1% to 50% by weight.

References Cited in the file of this patent

UNITED STATES PATENTS 1,991,204    Grenagle _____ Feb. 12, 1935

FOREIGN PATENTS 478,016    Great Britain _____ 1938